(12) United States Patent
Chikara et al.

(10) Patent No.: US 12,489,737 B2
(45) Date of Patent: Dec. 2, 2025

(54) COMMUNICATION SYSTEM, COMMUNICATION APPARATUS, METHOD, AND PROGRAM

(71) Applicant: NTT, Inc., Tokyo (JP)

(72) Inventors: Sakae Chikara, Tokyo (JP); Tsunekazu Saito, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/710,064

(22) PCT Filed: Nov. 17, 2021

(86) PCT No.: PCT/JP2021/042273
§ 371 (c)(1),
(2) Date: May 14, 2024

(87) PCT Pub. No.: WO2023/089699
PCT Pub. Date: May 25, 2023

(65) Prior Publication Data
US 2025/0016140 A1    Jan. 9, 2025

(51) Int. Cl.
*H04L 29/06*    (2006.01)
*H04L 9/08*    (2006.01)
(Continued)

(52) U.S. Cl.
CPC .......... *H04L 63/0428* (2013.01); *H04L 9/085* (2013.01); *H04L 9/3073* (2013.01)

(58) Field of Classification Search
None
See application file for complete search history.

(56) References Cited

U.S. PATENT DOCUMENTS

| | | | | |
|---|---|---|---|---|
| 6,282,295 | B1* | 8/2001 | Young | H04L 9/3013 380/30 |
| 8,144,869 | B2* | 3/2012 | Nakano | H04L 9/0822 380/201 |

(Continued)

OTHER PUBLICATIONS

Quantum Key Distribution (QKD) et al. (2020) "ETSI GS QKD 004 V2.1.1 (Aug. 2020) Quantum Key Distribution (QKD); Application Interface", 22 pages.

(Continued)

*Primary Examiner* — Maung T Lwin

(57) ABSTRACT

A communication system according to one embodiment is a communication system including a plurality of communication apparatuses, in which each communication apparatus includes: an application program configured to perform encrypted communication with another communication apparatus; a protocol conversion unit configured to transmit a message representing a predetermined procedure when a key request for a shared key to be used in the encrypted communication is received from the application program; a state management unit configured to receive a message from the protocol conversion unit to manage an execution state of the procedure, and to transmit the message to a protocol driver supporting a predetermined key sharing protocol; and a protocol driver configured to request a key sharing system that executes the key sharing protocol, to generate the shared key, when the message is received from the state management unit.

7 Claims, 7 Drawing Sheets

(51) Int. Cl.
*H04L 9/30* (2006.01)
*H04L 9/40* (2022.01)

(56) References Cited

U.S. PATENT DOCUMENTS

| | | | |
|---|---|---|---|
| 10,169,587 B1 * | 1/2019 | Nix | H04L 9/14 |
| 2014/0044260 A1 | 2/2014 | Baba et al. | |
| 2014/0101444 A1 * | 4/2014 | Lee | H04L 63/06 |
| | | | 713/168 |
| 2015/0271147 A1 * | 9/2015 | Tanizawa | H04L 9/0852 |
| | | | 713/171 |
| 2016/0099814 A1 * | 4/2016 | Negi | H04L 9/3268 |
| | | | 713/171 |
| 2018/0351737 A1 | 12/2018 | Tanizawa | |
| 2022/0029800 A1 * | 1/2022 | Sergeev | H04L 9/0891 |

OTHER PUBLICATIONS

Quantum Key Distribution (QKD) et al. (2019) "ETSI GS QKD 014 V1.1.1 (Feb. 2019) Quantum Key Distribution (QKD); Protocol and data format of REST-based key delivery API", 22 pages.
European patent application No. 21964715.3, EESR dated Jun. 11, 2025, 10 pages.

* cited by examiner

COMMUNICATION SYSTEM, COMMUNICATION APPARATUS, METHOD, AND PROGRAM

CROSS-REFERENCE TO RELATED APPLICATIONS

This application is a U.S. 371 Application of International Patent Application No. PCT/JP2021/042273, filed on 17 Nov. 2021, the disclosure of which is hereby incorporated herein by reference in its entirety.

TECHNICAL FIELD

The present invention relates to a communication system, a communication apparatus, a method, and a program.

BACKGROUND ART

A key sharing protocol called "quantum key distribution" (QKD) is known (see, for example, NPL 1 and NPL 2). QKD is a technology in which a key is shared, by quantum teleportation, to keep communications between two parties confidential, and that key is used (hereinafter, also referred to as a "shared key") to encrypt communications.

CITATION LIST

Non-Patent Literature

[NPL 1] ETSI GS QKD 004 V2.1.1 (2020-08) Quantum Key Distribution (QKD); Application Interface
[NPL 2] ETSI GS QKD 014 V1.1.1 (2019-02) Quantum Key Distribution (QKD); Protocol and data format of REST-based key delivery API

SUMMARY OF INVENTION

Technical Problem

However, in QKD, there is a physical restriction that a device for sharing a key and a device for transmitting and receiving data are separate devices. Further, the key delivery specification is different from the specification of the key delivery in TLS, IPsec or the like, for example. For this reason, an application which performs encrypted communication using a shared key cannot use QKD by following the same procedures as conventional key sharing protocols.

One embodiment of the present invention has been devised in view of the foregoing points, and an object thereof is to enable applications to use arbitrary key sharing protocols in the same procedures.

Solution to Problem

In order to achieve the object, a communication system according to an embodiment includes a plurality of communication apparatuses, each one of the plurality of communication apparatuses including: an application program configured to perform encrypted communication with another communication apparatus; a protocol conversion unit configured to transmit a message representing a predetermined procedure when a key request for a shared key to be used in the encrypted communication is received from the application program; a state management unit configured to receive a message from the protocol conversion unit to manage an execution state of the procedure, and to transmit the message to a protocol driver supporting a predetermined key sharing protocol; and a protocol driver configured to request a key sharing system that executes the key sharing protocol, to generate the shared key, when the message is received from the state management unit.

Advantageous Effects of Invention

The application can use any key sharing protocol in the same procedures.

DESCRIPTION OF EMBODIMENTS

Hereinafter, embodiments of the present invention will be described. Hereinafter, a communication system 1 in which an application can use arbitrary key sharing protocols in the same procedures will be described. According to the communication system 1, an application for performing encrypted communication by using a shared key can use an arbitrary key sharing protocol including QKD in the same procedures, and for example, various key sharing protocols can be easily switched. The key sharing protocol is a protocol for generating the same shared key between two parties, and may be referred to as, for example, a "key exchange protocol" or a "key delivery protocol".

<Overall Configuration of Communication System 1>

Figure 1:
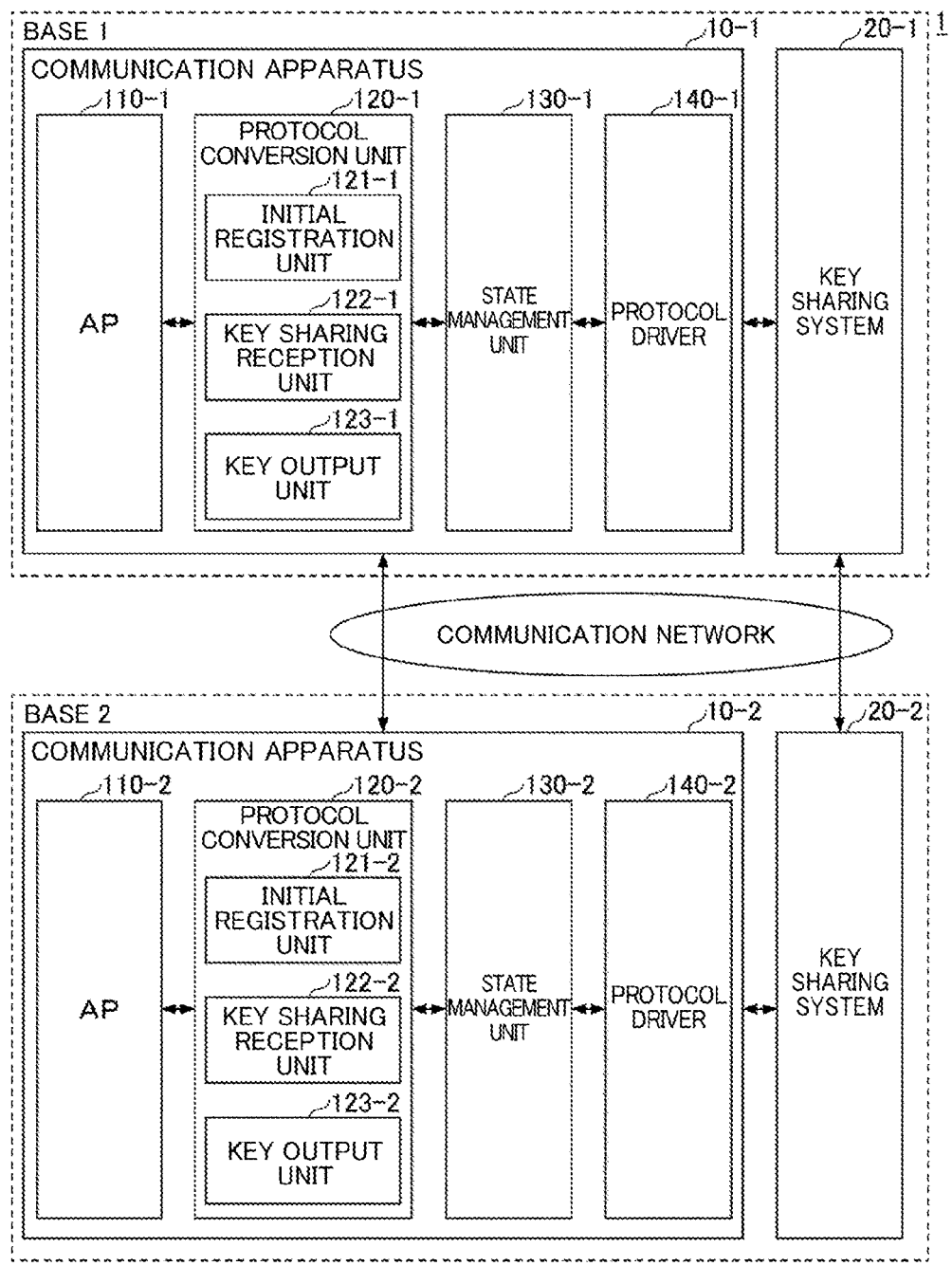
FIG. 1 is a diagram illustrating an example of an overall configuration of a communication system according to the present embodiment.

FIG. 1 illustrates an example of the overall configuration of a communication system 1 according to the present embodiment. FIG. 1 shows, as an example, a communication system 1 in the case where encrypted communication is performed between bases 1 and 2. In the communication system 1 illustrated in FIG. 1, a communication apparatus 10-1 and a key sharing system 20-1 are included in the base 1, and a communication apparatus 10-2 and a key sharing system 20-2 are included in the base 2.

The communication apparatus 10-1 performs encrypted communication with the communication apparatus 10-2 by using a key (shared key) shared between the key sharing system 20-1 and the key sharing system 20-2. In addition, the key sharing system 20-1 generates a shared key with the key sharing system 20-2 based on a predetermined key sharing protocol. Here, the communication apparatus 10-1 includes an application program (hereinafter referred to as an "AP") 110-1, a protocol conversion unit 120-1, a state management unit 130-1, and a protocol driver 140-1. In addition, the protocol conversion unit 120-1 includes an initial registration unit 121-1, a key sharing reception unit 122-1, and a key output unit 123-1.

Similarly, the communication apparatus 10-2 performs encrypted communication with the communication apparatus 10-1 using a key (shared key) shared between the key sharing system 20-1 and the key sharing system 20-2. In addition, the key sharing system 20-2 generates a shared key with the key sharing system 20-1 based on a predetermined key sharing protocol. Here, the communication apparatus 10-2 includes an AP 110-2, a protocol conversion unit 120-2, a state management unit 130-2, and a protocol driver 140-2. The protocol conversion unit 120-2 includes an initial registration unit 121-2, a key sharing reception unit 122-2, and a key output unit 123-2.

Hereafter, when the communication apparatus 10-1 and the communication apparatus 10-2 are not distinguished, the communication apparatus 10-1 and the communication apparatus 10-2 will be referred to as "communication apparatus 10". When the key sharing system 20-1 and the key sharing system 20-2 are not distinguished, the key sharing system 20-1 and the key sharing system 20-2 will be referred to as "key sharing system 20". Similarly, for the others, reference will be made to "AP 110", "protocol conversion unit 120", "initial registration unit 121", "key sharing reception unit 122", "key output unit 123", "state management unit 130", and "protocol driver 140".

In the following description, an arbitrary key protocol is realized by dividing the arbitrary key protocol into the five following steps in order to be realized.

Key request (Key Request)
Key ID sharing (KeyID Share)
Key sharing (KeyShare)
Key acquisition (KeyGet)
Key notification (KeyNotify)

Then, an application using the shared key realizes the original key sharing protocol by appropriately combining all or a part of the above five steps. Thus, the specific mechanism of the key sharing protocol is concealed from the application program using the shared key, so that the application program can realize various key sharing protocols by combining all or a part of the above five steps.

The AP 110 is an application program for performing encrypted communication with the AP 110 of the other communication apparatus 10 by using the shared key.

The protocol conversion unit 120 receives a key request (or a message representing it) from the AP 110, and transmits a key notification (or a message representing it) to the AP 110. In addition, the protocol conversion unit 120 shares key IDs, transmits a key acquisition (or a message representing it), and receives the result to the state management unit 130. In addition to these, the protocol conversion unit 120 performs various processes for realizing a predetermined key exchange protocol by all or a part of the above five steps, and processes related thereto.

The state management unit 130 manages the protocol driver 140 and manages the state of the key sharing protocol corresponding to the protocol driver 140.

The protocol driver 140 is a program for transmitting and receiving various messages to and from the key sharing system 20, and for executing specific processes. The protocol driver 140 is required for each key sharing system 20. For example, when the key sharing system 20 shares a key based on QKD, the protocol driver 140 supporting QKD is required. When the key sharing system 20 shares a key based on post-quantum key distribution (PQKD), the protocol driver 140 supporting PQKD is required.

The protocol driver 140 defines various processes of the key sharing protocol corresponding to the protocol driver 140 for each of key ID sharing, key sharing, and key acquisition. Thus, when key ID sharing, key sharing, or key acquisition is received, the protocol driver 140 can perform the key ID sharing process, the key sharing process, or the key acquisition process that is specific to the key sharing protocol corresponding to the protocol driver 140.

The initial registration unit 121 performs registration, various initial registrations, and the like of the protocol driver 140. The initial registration includes, for example, setting and registration of various keys used for key sharing (for example, signature key, verification key, pre-shared key, or the like), initiator/responder registration, and the like. Initiator/responder registration is to register whether the AP 110 is the initiator or the responder.

The key sharing reception unit 122 receives a key request from the AP 110, and performs key ID sharing, key acquisition or the like to the state management unit 130 in response to the key request.

The key output unit 123 performs key notification or the like for notifying the AP 110 of the shared key received from the state management unit 130.

In the example illustrated in FIG. 1, the communication apparatus 10 and the key sharing system 20 are separate entities at each base, but may be integrated together depending on the key sharing protocol executed by the key sharing system 20. For example, when the key sharing protocol executed by the key sharing system 20 is PQKD or the like, the communication apparatus 10 and the key sharing system 20 may be provided as one entity (to be more specific, the key sharing system 20 may be included in the communication apparatus 10). On the other hand, for example, when the key sharing protocol executed by the key sharing system 20 is QKD or the like, the communication apparatus 10 and the key sharing system 20 are provided as separate entities.

Further, the communication network between the communication apparatuses 10 and the communication network between the key sharing systems 20 may be the same or different, depending on the key sharing protocol executed by the key sharing system 20. For example, when the key sharing protocol executed by the key sharing system 20 is PQKD or the like, the communication network between the communication apparatuses 10 and the communication network between the key sharing systems 20 may be the Internet or the like. On the other hand, for example, when the key sharing protocol executed by the key sharing system 20 is QKD or the like, the communication network between the communication apparatuses 10 is the Internet or the like, and the communication network between the key sharing systems 20 is an optical communication network or the like.

When the key sharing protocol executed by the key sharing system 20 is QKD, the communication apparatus 10 and the key sharing system 20 at the same base are connected by a communication network such as a local area network.

<Protocol Driver Registration Process>

Figure 2:
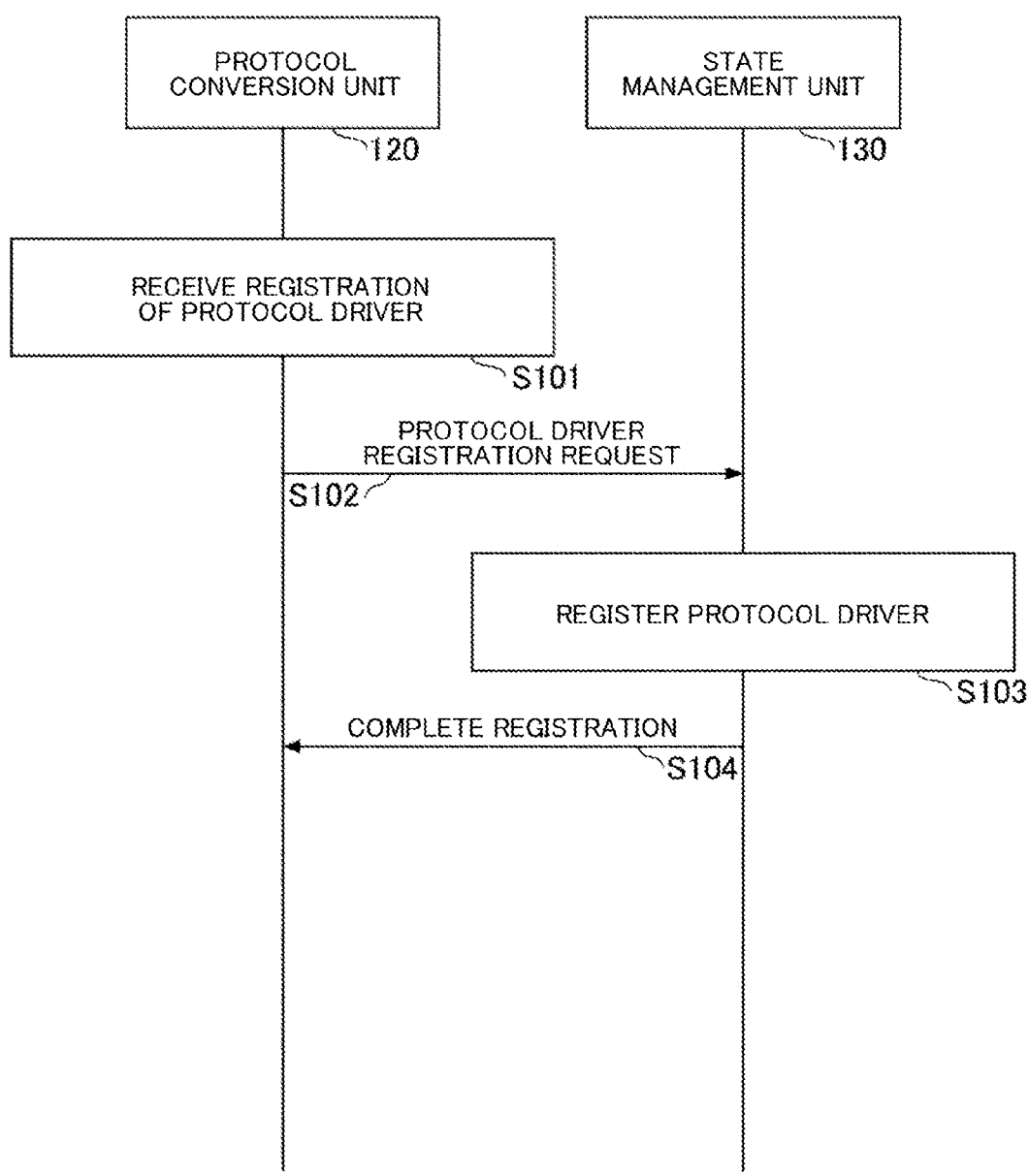
FIG. 2 is a sequence diagram illustrating an example of protocol driver registration process according to the present embodiment.

Hereinafter, processes of the registering the protocol driver 140 in the communication apparatus 10 (protocol driver registration process) will be described with reference to FIG. 2.

The initial registration unit 121 of the protocol conversion unit 120 receives registration of the protocol driver 140 (Step S101). The protocol driver 140 itself is inputted from a recording medium such as a CD-ROM or a USB memory.

The initial registration unit 121 of the protocol conversion unit 120 transmits a protocol driver registration request including the protocol driver 140 to the state management unit 130 (Step S102). The state management unit 130 registers the protocol driver 140 included in the protocol driver registration with the communication apparatus 10 (Step S103), and returns a registration completion (Step S104). Thus, the protocol driver 140 is registered with the communication apparatus 10.

<Initial Registration Process>

Hereinafter, the initial registration process will be described with reference to FIG. 3.

The AP 110 transmits the initial registration information to the protocol conversion unit 120 (Step S201). The initial registration information includes, for example, at least initial setting information for the key sharing system 20 (including a verification key (or a pre-shared key) for a signature of the protocol driver 140). In addition, the initial registration information may include initial setting information for the protocol driver 140 (including a signature key and a verification key (or a pre-shared key) that are used when communicating with the key sharing system 20 or the protocol driver 140 of another base point).

The initial registration unit 121 of the protocol conversion unit 120 receives initial registration information (Step S202), and transmits the initial registration information to the state management unit 130 (Step S203). The state management unit 130 transmits the initial registration information to the protocol driver 140 (Step S204). The protocol driver 140 performs initial setting (for example, setting of a signature key/verification key (or a pre-shared key)) from the initial registration information, and then transmits the initial registration information to the key sharing system 20 (Step S205). The key sharing system 20 performs initial setting (for example, setting of a verification key (or a pre-shared key) or the like) from the initial registration information, and then returns registration completion (Steps S206 to S209).

Here, the keys (signature key, verification key, and pre-shared key) in the initial setting are set as follows:

When the key sharing protocol executed by the key sharing system 20 is QKD

In the protocol driver 140 of the communication apparatus 10, a verification key (or a pre-shared key) for a signature of the key sharing system 20 at the same base is set. Similarly, in the key sharing system 20, a verification key (or a pre-shared key) for the signature of (the protocol driver 140 of) the communication apparatus 10 at the same site is set. That is, a verification key (or a pre-shared key) for performing mutual authentication between (the protocol driver 140 of) the communication apparatus 10 and the key sharing system 20 is set. This is because the communication apparatus 10 and the key sharing system 20 are separate from each other in QKD, and it is necessary to transmit a shared key from the key sharing system 20 to the communication apparatus 10 via a communication network such as an local area network.

In addition, when the AP 110 of the communication apparatus 10 becomes a responder, a verification key (or a pre-shared key) for the signature of the initiator is set in a protocol driver 140 of the communication apparatus 10.

When the key sharing protocol executed by the key sharing system 20 is PQKD

When the AP 110 of the communication apparatus 10 becomes a responder, a verification key for the signature of the initiator (or a verification key or a pre-shared key for performing mutual authentication between the initiator and the responder) is set in a key sharing system 20 included in the communication apparatus 10.

Figure 3:
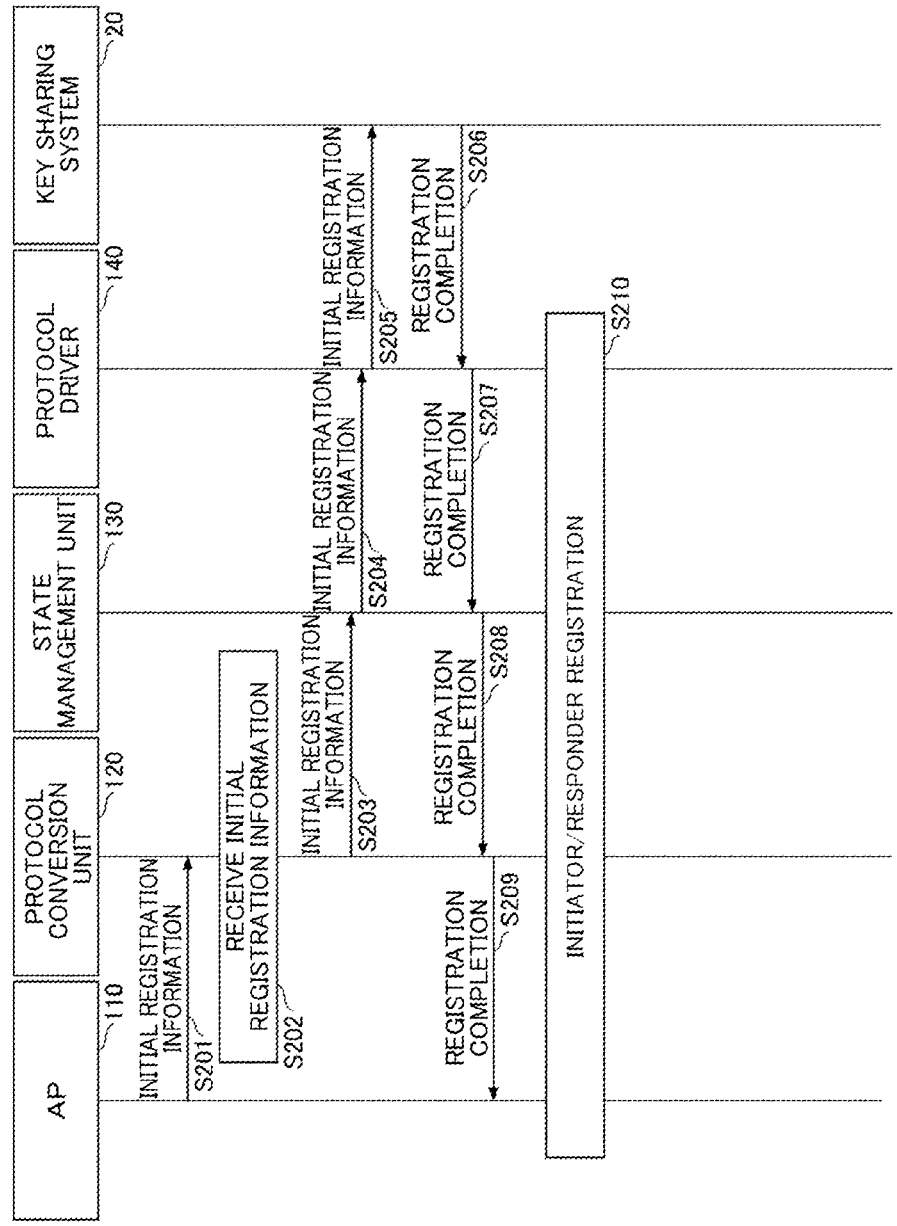
FIG. 3 is a sequence diagram illustrating an example of initial registration process according to the present embodiment.

Returning to the description of FIG. 3, in step S210, initiator/responder registration is performed. In initiator/responder registration, information indicating whether the AP 110 is the initiator or the responder (hereinafter also referred to as "initiator and responder information") is registered with the AP 110 and the protocol driver 140. There are mainly two registration methods.

The first method is called "invitation registration". In invitation registration, the protocol driver 140 transmits invitation information including initiator and responder information to the AP 110 via the state management unit 130 and the protocol conversion unit 120. The AP 110 can approve of or deny the invitation information. When the AP 110 approves of the invitation information, the AP 110 transmits information indicating approval to the protocol driver 140 via the protocol conversion unit 120 and the state management unit 130. Thus, the initiator and responder information is registered with the AP 110 and the protocol driver 140.

The second method is called "callback registration". In callback registration, the AP 110 transmits a callback registration request including initiator and responder information to the protocol driver 140 via the protocol conversion unit 120 and the state management unit 130. The protocol driver 140 registers the initiator and responder information included in the callback registration request, and then transmits the registration result to the AP 110 via the state management unit 130 and the protocol conversion unit 120. Thus, the initiator and responder information is registered with the AP 110 and the protocol driver 140.

<Processes from Key Request to Key Notification>

Figure 4:
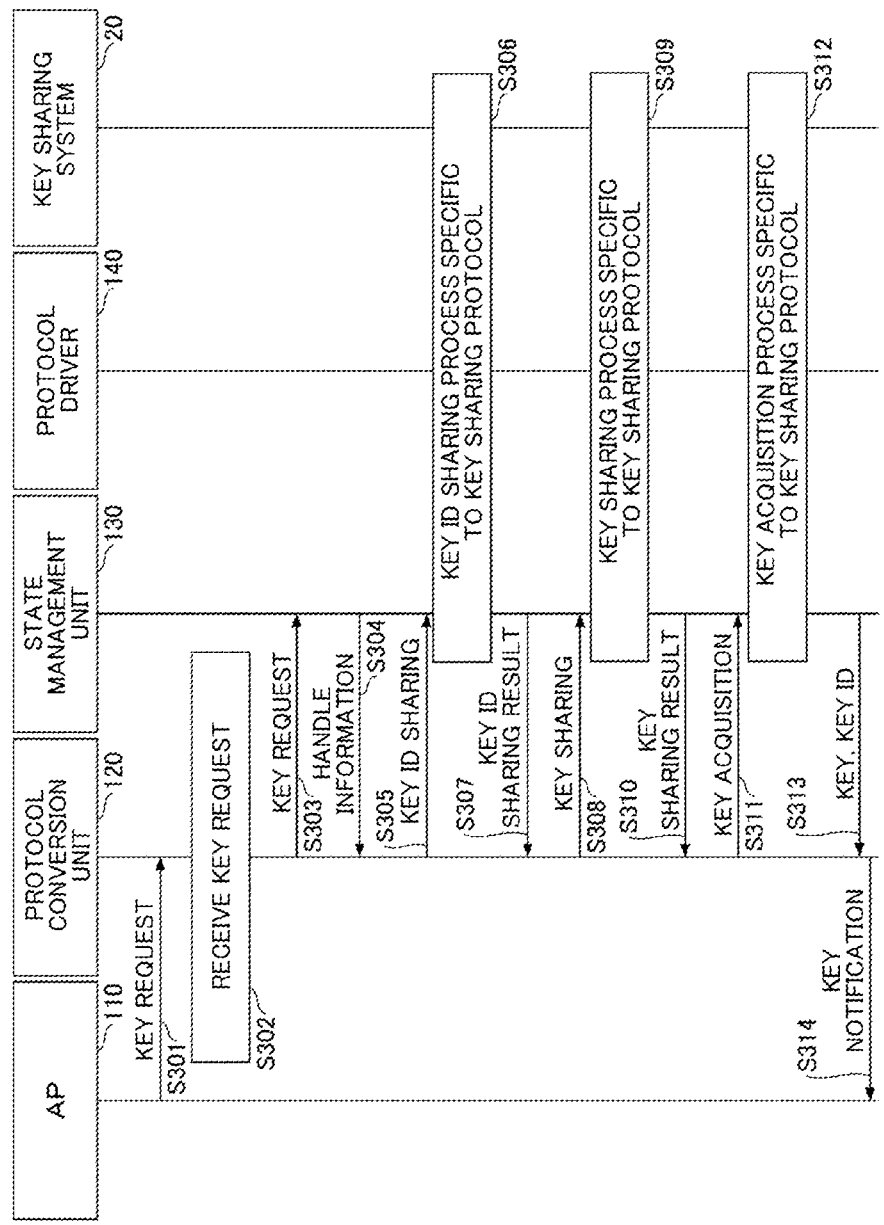
FIG. 4 is a sequence diagram illustrating an example of processes from key request to key notification according to the present embodiment.

In the following, processes for performing key sharing of a predetermined key sharing protocol according to the above five steps (key request, key ID sharing, key sharing, key acquisition, and key notification) will be described with reference to FIG. 4. In the following, as an example, the AP 110 is assumed to be the initiator.

The AP 110 transmits a key request to the protocol conversion unit 120 (Step S301). The key sharing reception unit 122 of the protocol conversion unit 120 receives a key request (Step S302). Then, the protocol conversion unit 120 transmits a key request to the state management unit 130 (Step S303).

The state management unit 130 transmits handle information to the protocol conversion unit 120 (Step S304). The handle information is information for managing a processing state until a shared key is notified to the AP 110. At this time, the protocol conversion unit 120 which has received the handle information updates the handle information to information indicating that, for example, key request has been executed.

The protocol conversion unit 120 transmits key ID sharing to the state management unit 130 (Step S305). A Key ID sharing process that is unique to the key sharing protocol corresponding to the protocol driver 140 is executed by at least a part of the state management unit 130, the protocol driver 140, and the key sharing system 20 (Step S306). Then, the state management unit 130 transmits the result of the key ID sharing process (key ID sharing result) unique to the key sharing protocol to the protocol conversion unit 120 (Step S307). At this time, the protocol conversion unit 120 receiving the key ID updates the handle information to information indicating that, for example, key ID sharing has been executed.

The protocol conversion unit 120 transmits key sharing to the state management unit 130 (Step S308). A key sharing process that is specific to the key sharing protocol corresponding to the protocol driver 140 is executed by at least a part of the state management unit 130, the protocol driver 140 and the key sharing system 20 (Step S309). Then, the state management unit 130 transmits the result of the key sharing process (key sharing result) specific to the key sharing protocol to the protocol conversion unit 120 (Step S310). At this time, the protocol conversion unit 120 receiving the key sharing result updates the handle information to information indicating that, for example, key sharing has been executed.

The protocol conversion unit 120 transmits key acquisition to a state management unit 130 (Step S311). A key acquisition process that is specific to the key sharing protocol corresponding to the protocol driver 140 is executed by at least a part of the state management unit 130, the protocol driver 140 and the key sharing system 20 (Step S312). Then, the state management unit 130 transmits the key and the key ID acquired by the key acquisition process specific to the key sharing protocol to the protocol conversion unit 120 (Step S313). At this time, the protocol conversion unit 120 receiving the key updates the handle information to information indicating that, for example, key acquisition has been executed. According to the key sharing protocol executed by the key sharing system 20, only the key may be acquired by key acquisition or only the key ID may be acquired.

The key output unit 123 of the protocol conversion unit 120 notifies the AP 110 of the key (shared key) and the key ID received from the state management unit 130 (Step S314). Thus, the AP 110 can perform encrypted communication using the shared key with the AP 110 of the other base.

Example 1: Case of QKD

Figure 5:
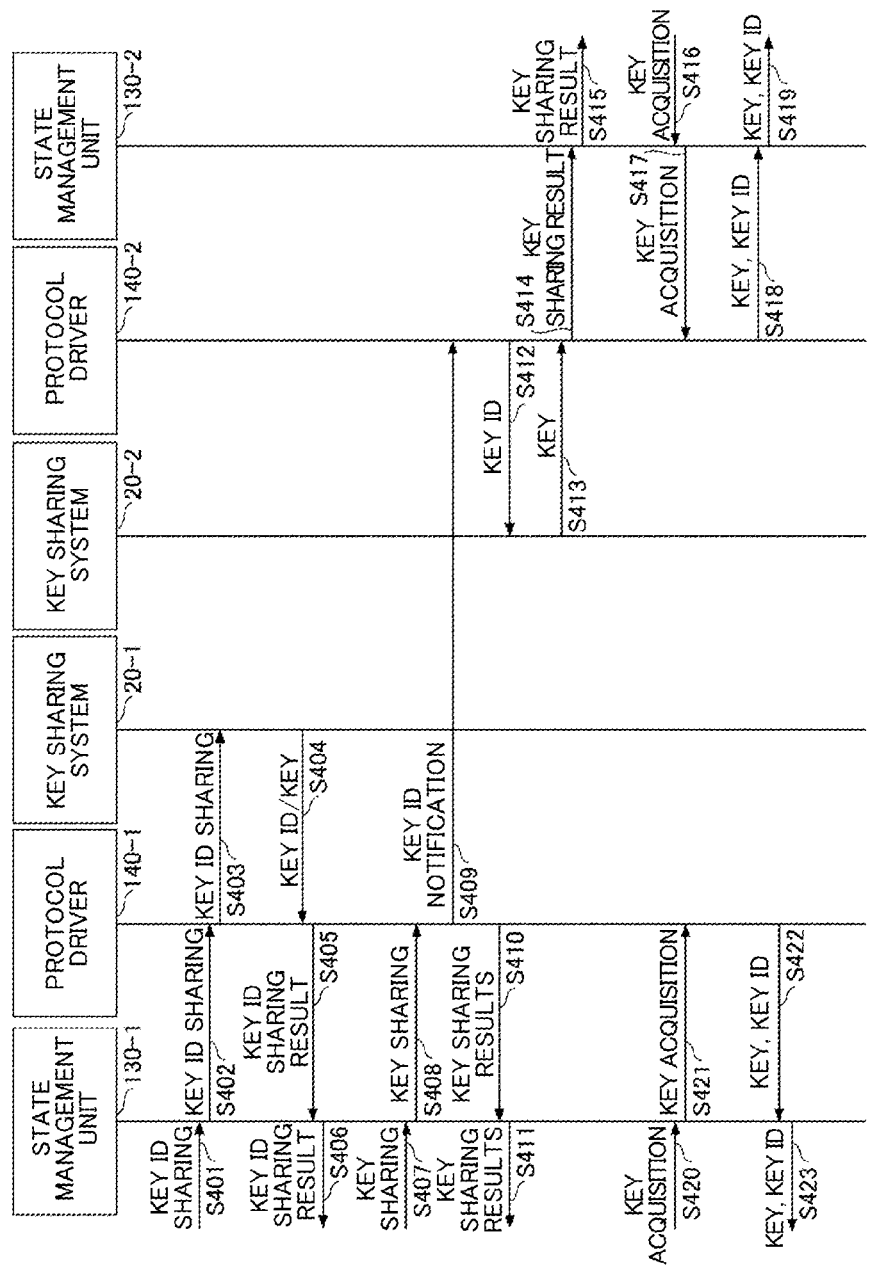
FIG. 5 is a sequence diagram illustrating an example of processes from key ID sharing to key acquisition in Example 1.

In the following, as Embodiment 1, processing examples of Steps S305 to S313 in FIG. 4 when the key sharing protocol executed by the key sharing system 20 is QKD will be described with reference to FIG. 5. In addition, in the following, the AP 110-1 is assumed to be an initiator and the AP 110-2 is assumed to be a responder.

The key ID sharing process specific to QKD corresponds to Steps S402 to S405, the key sharing process specific to QKD corresponds to Steps S408 to S410 and Steps S412 to S414, and the key acquisition process specific to QKD corresponds to Steps S417 and S418 and Steps S421 to S422.

When the state management unit 130-1 receives the key ID sharing from the protocol conversion unit 120-1 (Step S401), the state management unit 130-1 transmits the key ID sharing to the protocol driver 140-1 (Step S402). When the protocol driver 140-1 receives the key ID sharing from the state management unit 130-1, the protocol driver 140-1 transmits the key ID sharing to the key sharing system 20-1 (Step S403). When the key sharing system 20-1 receives key ID sharing from the protocol driver 140-1, the key sharing system 20-1 transmits a key (shared key) generated based on QKD with the key sharing system 20-2 and the key ID to the protocol driver 140-1 (Step S404). In the communication between the protocol driver 140-1 and the key sharing system 20-1, mutual authentication is performed by a key (verification key or pre-shared key) set in the initial setting, and a secure channel is constituted by, for example, TLS or the like.

Here, when transmitting the shared key and the key ID in Step S404 above, the key sharing system 20-1 may calculate a hash value from the shared key and the key ID, and transmit this hash value (hereinafter referred to as the "first hash value") together. The calculation of the first hash value may be executed by the protocol driver 140-1 in Step S405 to be described later, or may be executed by the state management unit 130-1 in Step S406. In the following, it is assumed that the shared key, the key ID and the first hash value are transmitted in Step S404.

When the protocol driver 140-1 receives the shared key, the key ID and the first hash value, the key ID sharing result indicating that the key ID sharing is completed is transmitted to the state management unit 130-1 (Step S405). When the state management unit 130-1 receives the key ID sharing result, the state management unit 130-1 transmits the key ID sharing result to the protocol conversion unit 120-1 (Step S406).

When the state management unit 130-1 receives the key sharing from the protocol conversion unit 120-1 (Step S407), the state management unit 130-1 transmits the key sharing to the protocol driver 140-1 (Step S408). When the protocol driver 140-1 receives the key sharing, the protocol driver 140-1 calculates a second hash value from the shared key and the key ID received from the key sharing system 20-1 in Step S404, verifies whether or not the second hash value matches the first hash value, and transmits the key ID and the first hash value to the protocol driver 140-2 when the verification is successful (Step S409). At this time, the protocol driver 140-1 adds a signature to the key ID and the first hash value by using the signature key of the communication apparatus 10-1.

When the protocol driver 140-1 transmits the key ID, the first hash value, and a signature for them to the protocol driver 140-2, the protocol driver 140-1 transmits a key sharing result indicating that key sharing is completed to the state management unit 130-1 (Step S410). Then, the state management unit 130-1 transmits the key sharing result to the protocol conversion unit 120-1 (Step S411).

On the other hand, when the protocol driver 140-2 receives the key ID, the first hash value and the signature for them, the protocol driver 140-2 verifies the signature by the verification key of the protocol driver 140-1 and transmits the key ID to the key sharing system 20-2 when the verification is successful (Step S412). When the key sharing system 20-2 receives the key ID, the key of the key ID (that is, a shared key generated based on QKD with the key sharing system 20-1) is transmitted to a protocol driver 140-2 (Step S413). The protocol driver 140-2 calculates a third hash value from the shared key and the key ID received from the key sharing system 20-1 and verifies whether or not the third hash value matches the first hash value, and transmits a key sharing result to a state management unit 130-2 when the verification is successful (Step S414). Then, the state management unit 130-2 transmits the key sharing result to a protocol conversion unit 120-2 (Step S415).

When receiving the key acquisition from the protocol conversion unit 120-2 (Step S416), the state management unit 130-2 transmits the key acquisition to a protocol driver 140-2 (Step S417). When receiving the key acquisition, the protocol driver 140-2 transmits the shared key and the key ID to the state management unit 130-2 (Step S418). Then, the state management unit 130-2 transmits the shared key and the key ID to the protocol conversion unit 120-2 (Step S419). In Steps S418 and S419, the first hash value may be transmitted together with the shared key and the key ID.

When receiving the key acquisition from the protocol conversion unit 120-1 (Step S420), the state management unit 130-1 transmits the key acquisition to the protocol driver 140-1 (Step S421). When receiving the key acquisition, the protocol driver 140-1 transmits the shared key and the key ID to the state management unit 130-1 (Step S422). Then, the state management unit 130-1 transmits the shared key and the key ID to the protocol conversion unit 120-1 (Step S423). In Steps S422 and S423, the first hash value may be transmitted together with the shared key and the key ID.

In order to calculate the first hash value to the third hash value, information obtained by combining the shared key and the key ID may be inputted to a prescribed hash function. At this time, the hash function with a key may be used as the hash function.

Here, a plurality of key sharing systems 20 may exist for one communication apparatus 10 at each base. In this case, in Step S409, information for identifying the key sharing system 20 on the initiator side and information for identifying the key sharing system 20 on the responder side are transmitted in addition to the key ID and the first hash value.

Example 2: Case of PQKD

Figure 6:
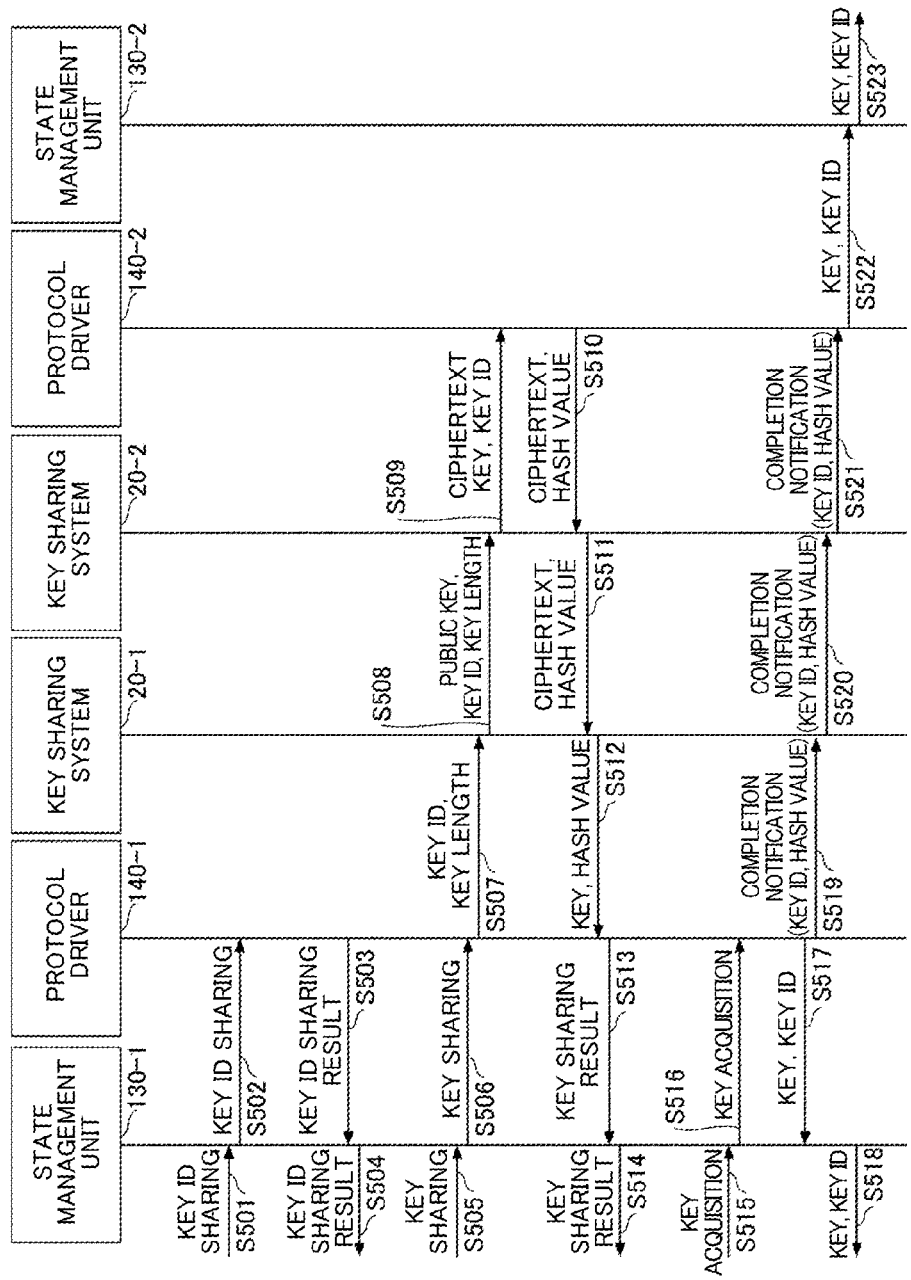
FIG. 6 is a sequence diagram illustrating an example of processes from key ID sharing to key acquisition in Example 2.

In the following, as Embodiment 2, the processing examples of Steps S305 to S313 in FIG. 4 when the key sharing protocol executed by the key sharing system 20 is PQKD will be described with reference to FIG. 6. In addition, in the following, the AP 110-1 is assumed to be an initiator and the AP 110-2 is assumed to be a responder.

The key ID sharing process specific to the PQKD corresponds to Steps S502 and S503, the key sharing process specific to the PQKD corresponds to Steps S506 to S513, and the key acquisition process specific to the PQKD corresponds to steps S516 to S517 and steps S519 to S522.

When the state management unit 130-1 receives the key ID sharing from the protocol conversion unit 120-1 (Step S501), the state management unit 130-1 transmits the key ID sharing to the protocol driver 140-1 (Step S502). The protocol driver 140-1 generates a key ID and then transmits the key ID sharing result indicating that the key ID sharing is completed to a state management unit 130-1 (Step S503). Then, the state management unit 130-1 transmits the key ID sharing result to a protocol conversion unit 120-1 (Step S504).

When the state management unit 130-1 receives the key sharing from the protocol conversion unit 120-1 (Step S505), the state management unit 130-1 transmits the key sharing to the protocol driver 140-1 (Step S506). When receiving the key sharing, the protocol driver 140-1 transmits the key ID generated in Step S503 and a predetermined key length to the key sharing system 20-1 (Step S507). When the key sharing system 20-1 receives the key ID and the key length, the key sharing system 20-1 generates a key pair of a public key Pk and a secret key SK by a quantum resistant public key encryption system, and transmits the public key Pk, the key ID, the key length, and the signature (or message authentication code) for them to the key sharing system 20-2 (Step S508). In communication between the key sharing system 20-1 and the key sharing system 20-2, mutual authentication is performed by a key (verification key or pre-sharing) set in initial setting, and a secure channel is constituted by, for example, TLS or the like.

When receiving the public key PK, the key ID, the key length, and the signature (or message authentication code) for them, the key sharing system 20-2 verifies the signature (or message authentication code). If the verification is successful, the public key Pk is input to an encryption algorithm of a key encapsulation mechanism (KEM) to generate a session key ssk and its ciphertext ctx, a shared key is generated by a key derivation function by using the session key ssk and key length as inputs, and the ciphertext ctx, the shared key, and the key ID are transmitted to the protocol driver 140-2 (Step S509). When receiving the ciphertext ctx, the shared key, and the key ID, after calculating a hash value (hereinafter referred to as the "fourth hash value") from the shared key and the key ID, the protocol driver 140-2 holds the shared key, the key ID, and the fourth hash value, and transmits the ciphertext ctx and the fourth hash value to the key sharing system 20-2 (Step S510). When the key sharing system 20-2 receives the ciphertext ctx and the fourth hash value, the key sharing system 20-2 transmits the ciphertext ctx and the fourth hash value to the key sharing system 20-1 (Step S511).

When the key sharing system 20-1 receives the ciphertext ctx and the fourth hash value, the key sharing system 20-1 receives the secret key SK and the ciphertext ctx for the decryption algorithm of the key encapsulation mechanism to decrypt the session key ssk, generates the shared key by a key derivation function by using the session key ssk and the key length as inputs, and transmits the shared key and the fourth hash value to the protocol driver 140-1 (Step S512). When receiving the shared key and the fourth hash value, the protocol driver 140-1 calculates a hash value (hereinafter referred to as the "fifth hash value") from this shared key and the key ID generated in Step S503 above, verifies whether the fifth hash value matches the fourth hash value, holds the shared key, the key ID, and the fifth hash value when the verification is successful, and transmits the key sharing result indicating completion of key sharing to the state management unit 130-1 (Step S513). Then, the state management unit 130-1 transmits the key sharing result to the protocol conversion unit 120-1 (Step S514).

When the state management unit 130-1 receives key acquisition from the protocol conversion unit 120-1 (Step S515), the state management unit 130-1 transmits the key acquisition to the protocol driver 140-1 (Step S516). When receiving the key acquisition, the protocol driver 140-1 transmits the shared key and the key ID held in Step S513 to the state management unit 130-1 (Step S517). Then, the state management unit 130-1 transmits the shared key and the key ID to the protocol conversion unit 120-1 (Step S518).

In addition, the protocol driver 140-1 transmits a completion notification including the key ID and the fifth hash value held in Step S513 to the key sharing system 20-1 (Step S519). When receiving the completion notification, the key sharing system 20-1 transmits the completion notification to the key sharing system 20-2 (Step S520). When the key sharing system 20-2 receives the completion notification, the key sharing system 20-2 transmits the completion notification to the protocol driver 140-2 (Step S521). When the protocol driver 140-2 receives the completion notification, the protocol driver 140-2 transmits the key ID included in the completion notification and the shared key of the key ID to the state management unit 130-2 (Step S522). At this time, the protocol driver 140-2 may transmit the key ID and the shared key to the state management unit 130-2 only when the fifth hash value included in the completion notification matches the fourth hash value. Then, the state management unit 130-2 transmits the shared key and the key ID to the protocol conversion unit 120-2 (Step S523).

In order to calculate the fourth to fifth hash values, information obtained by combining the shared key and the key ID may be input to a predetermined hash function.

<Hardware Configuration>

Figure 7:
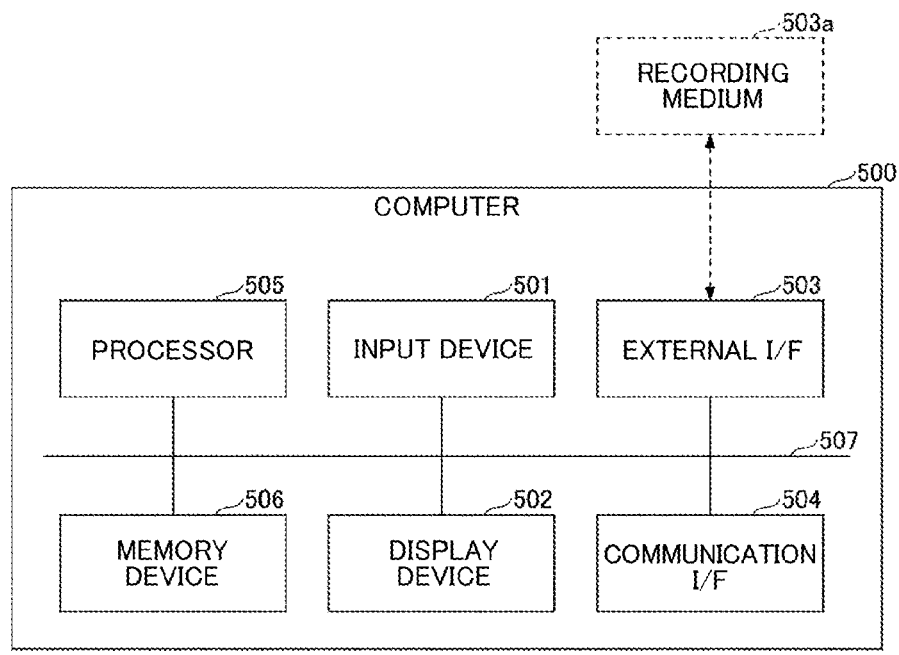
FIG. 7 is a diagram illustrating one example of a hardware configuration of a computer.

The communication apparatus 10 and the key sharing system 20 included in the communication system 1 according to the present embodiment are implemented by, for example, a hardware configuration of a computer 500 illustrated in FIG. 7. The computer 500 illustrated in FIG. 7 includes an input device 501, a display device 502, an external I/F 503, a communication I/F 504, a processor 505, and a memory device 506. The hardware is connected via a bus 507 to be able to communicate with each other.

Examples of the input device 501 include a keyboard, a mouse, a touchscreen, and various physical buttons. The display device 502 is, for example, a display or display panel. The computer 500 may not include, for example, at least one of the input device 501 or the display device 502.

An external I/F 503 is an interface with an external device such as a recording medium 503a. For the recording medium 503a, for example, a CD-ROM, a DVD-ROM, an SD memory card, a USB memory card or the like can be used.

The communication I/F 504 is an interface for connecting the computer 500 to a communication network. The processor 505 is, for example, any of various arithmetic devices such as a central processing unit (CPU). The memory device 506 is, for example, any of various storage devices such as a hard disk drive (HDD), a solid state drive (SSD), a random access memory (RAM), a read only memory (ROM), and a flash memory.

The hardware configuration of the computer 500 illustrated in FIG. 7 is merely an example, and other hardware configurations may be applied. For example, the computer 500 may have a plurality of processors 505 and a plurality of memory devices 506, and may have various hardware other than the illustrated hardware.

One or more programs that the AP 110, the protocol conversion unit 120, and the state management unit 130 illustrated in FIG. 1 implement, the protocol driver 140 and the like are stored in the memory device 506, and various processes are executed by the processor 505, thereby realizing various functions.

CONCLUSION

As described above, each communication apparatus 10 included in the communication system 1 according to the present embodiment includes the protocol conversion unit 120, the state management unit 130, and the protocol driver 140 between the AP 110 and the key sharing system 20. As a result, the AP 110 can use an arbitrary key sharing protocol in five steps: key request, key ID sharing, key sharing, key acquisition, and key notification. Therefore, the AP 110 does not need to follow procedures that are specific to the key sharing protocol, and various key sharing protocols can be used in the same procedures, and the key sharing protocol can be easily switched.

Supplementary Notes

In the communication system 1 according to the present embodiment, one key sharing system 20 is included in each base (see FIG. 1), but this is by no means limiting, and a plurality of key sharing systems 20 may be included in each base. In this case, the AP 110 of the communication apparatus 10 at the base can use a plurality of key sharing protocols.

When the AP 110 can use a plurality of key sharing protocols, which key sharing protocol is used can be determined or set by various methods. For example, the following determining or setting methods (1) to (3) can be used.

(1) A key sharing protocol to be used in standard (default) mode is set in the initial setting of the AP 110. In the event the default key sharing protocol is changed, only the default key sharing protocol is changed and set, without changing the other settings, similarly to the initial setting.

(2) At the time of key request (that is, Step S301 in FIG. 4), the default key sharing protocol is determined to be used. When a key sharing protocol other than the default key is used, the key sharing protocol is designated.

(3) When the AP 110 is called by call back or the like, a protocol that is different from the default key sharing protocol of the AP 110 on the responder side may be selected and designated on the initiator side. In such a case, information that can identify or specify the key sharing protocol selected and designated by the initiator side is notified to the AP 110 on the responder side. Thus, as a key sharing protocol used by the AP 110 on the responder side, a key sharing protocol selected and designated on the initiator side is designated.

The present invention is not limited to the specifically disclosed embodiments, and various modifications, changes, combinations with known techniques, and the like can be made without departing from the scope of the claims.

REFERENCE SIGNS LIST

1 Communication system
10 Communication apparatus
20 Key sharing system
110 AP
120 Protocol conversion unit
121 Initial registration unit
122 Key sharing reception unit
123 Key output unit
130 State management unit
140 Protocol driver
500 Computer
501 Input device
502 Display device
503 External I/F
503a Recording medium
504 Communication I/F
505 Processor
506 Memory device
507 Bus

The invention claimed is:

1. A communication system comprising a plurality of communication apparatuses, wherein each one of the plurality of communication apparatuses includes:
a processor; and
a memory having instructions stored thereon that, when executed by the processor, cause the processor to function as:
an application program unit configured to perform encrypted communication with another communication apparatus;
a protocol conversion unit configured to transmit a message representing a predetermined procedure when a key request for a shared key to be used in the encrypted communication is received from the application program unit;

a state management unit configured to receive a message from the protocol conversion unit to manage an execution state of the procedure, and to transmit the message to a protocol driver supporting a predetermined key sharing protocol; and the protocol driver configured to request a key sharing system that executes the key sharing protocol, to generate the shared key, when the message is received from the state management unit.

2. The communication system according to claim 1, wherein the procedure includes at least one of:
key ID sharing for sharing a key ID of the shared key;
key sharing for sharing the shared key;
key acquisition for acquiring at least one of the key ID and the shared key; or
key notification for outputting at least the shared key.

3. The communication system according to claim 1,
wherein the key sharing protocol is quantum key distribution,
wherein the key sharing system is a device that is physically different from the communication apparatus, and
wherein, when the shared key and the key ID of the shared key are received from the key sharing system, the protocol driver transmits the key ID, the shared key, and a hash value of the key ID, to the another apparatus.

4. The communication system according to claim 1,
wherein the key sharing protocol is post-quantum key distribution,
wherein the key sharing system is included in the communication apparatus, and
wherein the key sharing system:
generates a key pair of a public key and a secret key based on post-quantum cryptography; and
transmits, to the another communication apparatus:
a key ID generated by the protocol driver;
the public key;
a predetermined key length; and
a signature or a message authentication code for the key ID, the public key, and the key length.

5. A communication apparatus comprising:
a processor; and
a memory having instructions stored thereon that, when executed by the processor, cause the processor to function as:
an application program unit configured to perform encrypted communication with another communication apparatus;
a protocol conversion unit configured to transmit a message representing a predetermined procedure when a key request for a shared key to be used in the encrypted communication is received from the application program unit;
a state management unit configured to receive a message from the protocol conversion unit to manage an execution state of the procedure, and to transmit the message to a protocol driver supporting a predetermined key sharing protocol; and
a protocol driver configured to request a key sharing system that executes the key sharing protocol to generate the shared key when the message is received from the state management unit.

6. A method for use in a communication apparatus, the method comprising:
performing, by an application program unit, encrypted communication with another communication apparatus;
transmitting, by a protocol conversion unit, a message representing a predetermined procedure when a key request for a shared key to be used in the encrypted communication is received from the application program unit;
receiving, by a state management unit, a message from the protocol conversion unit to manage an execution state of the procedure, and transmitting the message to a protocol driver supporting a predetermined key sharing protocol; and
requesting, by the protocol driver, a key sharing system that executes the key sharing protocol, to generate the shared key, when the message is received from the state management unit.

7. A non-transitory recording medium storing a program that, when executed on a computer, causes the computer to perform the method of claim 6.

* * * * *